Nov. 30, 1943.  H. F. MITCHELL  2,335,526
ELECTRICAL SYSTEM FOR MOTOR VEHICLES
Filed Sept. 16, 1941
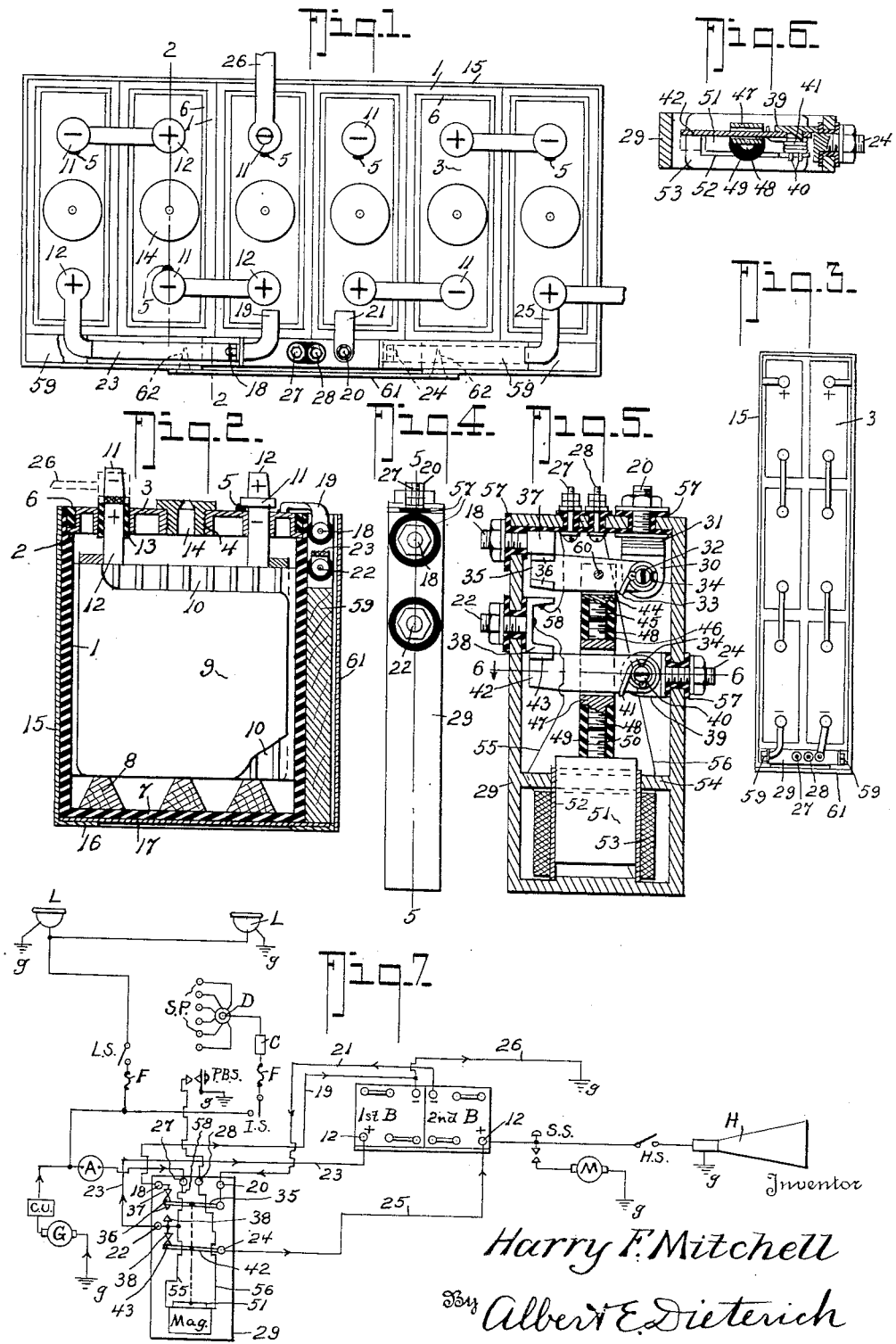
Inventor
Harry F. Mitchell
By Albert E. Dieterich
Attorney Patented Nov. 30, 1943

2,335,526

UNITED STATES PATENT OFFICE 2,335,526

ELECTRICAL SYSTEM FOR MOTOR VEHICLES

Harry F. Mitchell, Salem, Ohio

Application September 16, 1941, Serial No. 411,088

4 Claims. (Cl. 171—97)

My present invention relates to certain new and useful improvements in storage batteries used for starting, lighting and signaling systems of automobiles.

Primarily the invention seeks to provide a single self-contained unit comprising two batteries of the same voltage (say six volts) and a magnetic switch by means of which the two batteries may be placed, normally, in parallel to operate as a six-volt battery, and by means of which the two batteries may be placed in series to act as a twelve-volt battery.

Further, it is an object to provide a magnetic switch operated by a push button or equivalent and so connected with the positive and negative terminals of the two batteries that the lights, radio, etc., never get more than six volts, regardless of whether the two batteries are in parallel or in series.

Further, the invention has for an object to provide in a single self-contained unit a two-section battery and a switch device by means of which the starting motor may be caused to turn at two speeds, one speed with the magnetically operated switch in the "parallel" position and the other speed with the switch in the "series" position.

Further, it is an object to provide in a single self-contained unit a two section battery and switch device by means of which the signal horn of the vehicle may be caused to operate under either of the two voltages, thereby giving a two-tone effect to the horn.

Again, it is an object of my invention to provide a two-speed starting battery and series-parallel switch unit, so constructed that it may be substituted for the usual six-volt batteries on old cars (i. e., not at the factory) without doing away with the present starting switch, the new equipment requiring only two #12 wires running from the battery to the dash and a single hole-mounted push-button switch.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:

Fig. 1 is a top plan view of a unit of two batteries and switch embodying my invention.

Fig. 2 is a cross section of the same taken substantially on the line 2—2 of Fig. 1.

Fig. 3 is a plan view of another arrangement of the cells and switch.

Fig. 4 is an enlarged edge view of the magnetic switch.

Fig. 5 is a section on approximately the line 5—5 of Fig. 4.

Fig. 6 is a cross section on substantially the line 6—6 of Fig. 5.

Fig. 7 is a circuit diagram of the electrical system of an automobile embodying my invention.

In the drawing, in which like numbers and letters of reference indicate like parts in all the figures, it will be seen that the combined battery is composed of two sections or sub-units of three cells each. Each cell comprises a jar 1 having a seat 2 for a lead cover 3 which is held in place on the seat 2 by the sealing material 6. The cover 3 is provided with a threaded filler hole 4 and is welded at 5 to the terminal post 11.

Resting on the bottom 7 of the jar 1 are the usual wooden or hard rubber plate supports 8 on which the lead plates 9 and the usual wooden separators 10 rest.

11 and 12 designate the usual terminal posts, the (negative or, preferably, positive) ones 12 of which pass through insulating tubes (preferably rubber) 13, while the (positive or, preferably, negative) terminal posts 11 are welded at 5 to the cover 3 where they pass through the cover. A vent cap 14 is provided in the cover 3 of each cell.

The case 15 consists of a sheet of metal that extends around the groups of cells and has its ends spaced apart at the place where the magnetic switch is located (side or end of battery). The lower end of the case 15 is inwardly flanged, as at 16, to hold the bottom plate 17 of the case. The case 15—16 and its bottom plate 17 are preferably painted with an acid-proof insulating paint.

The magnetic switch, which constitutes an essential part of my invention, is best shown in Figs. 4, 5 and 6, by reference to which it will be seen that a closed iron frame 29 carries terminals 18, 20, 22 and 24 insulated at 57, the terminal 18 having a contact lug 37, the terminal 22 having a double contact lug 38, the terminal 20 having a bracket 30 with shims or washers 31 for adjustment, and the terminal 24 having a bracket 39.

The brackets 30 and 39 have, preferably, integrally cast bearing studs 32 and 40 respectively, the free ends of which are split to receive an end of a coil spring 33, 41, as the case may be, the other end of the springs being hooked under the blades 35, 42, as the case may be. The blades are pivoted on the studs and held in place with the springs and cotter pins 34, thus continually tending to lift the blades, normally to hold blade upper-contact lug 36 against lug 37 and blade contact lug 43 against the lower contact lug 38.

The blades are caused to move in unison by means of a connection which comprises a split member 44 pinned at 60 to the blade 35 and having a threaded stud 45 which is coupled to and spaced from the threaded stud 48 of a yoke 47 by means of an insulation coupling 46. The blade 42 passes freely through the yoke 47 and the yoke 47 has a second threaded stud 48 which is insulated from but coupled to the threaded stud 50 of the flat core armature 51 (steel or other suitable magnetic material) by the insulating coupling 49.

The core armature 51 works in a stationary tube 52 of brass on which is wound the magnet wire 53 one end of which runs, as at 55, to and is soldered to the lug 38, while the other end runs, as at 56, to and is secured to the insulated terminal 28. The tube 52 fits in and is supported by the cross bar 54 of the frame 29. Another insulated terminal 27 is connected by wire 58 to the lug 38.

The frame 29 sets against the side (Figs. 1 and 2) or end (Fig. 3) of the case 15 and is held in place by wooden spacers 59 and the removable cover plate 61, the latter being secured by screws 62 which pass through the case plate 15 near its adjacent ends and into the blocks or spacers 59 (see Fig. 1).

The several cells may be arranged in any convenient way in the case 15, for example, side by side as in Fig. 1, or in two series, edge for edge, as in Fig. 3. For convenience I prefer the arrangement shown in Fig. 1. In this figure, 19 represents a conductor strap or lead-copper connector between the terminal 18 and the lead cover 3 of the inner end cell of the first battery unit. A conductor strap 26 is attached to the negative terminal 11 of that same cell, which terminal, as before stated, is welded to the cover 3.

21 is the conductor strap or connector between the terminal 20 and the cover 3 (and consequently the negative terminal 11) of the inner end cell of the second battery unit.

23 represents the conductor strap or connector between the terminal 22 and the positive terminal 12 of the other end cell of the first battery, while 25 indicates the conductor strap between the positive terminal 12 of the other end cell of the second battery and terminal 24.

In Fig. 7, L represents the lights of the system, L. S. the light switch, S. P. the spark plugs, D the distributor, C the ignition coil, I. S. the ignition switch, F the fuses, A the ammeter, G the generator, C. U. the generator cut-out, S. S. the usual starter switch, M the starter motor, all of the usual construction.

P. B. S. indicates a push-button switch which, unless pressed, maintains open circuit. 12 volts does not do any harm to the starting motor, but causes it to start the car motor much more quickly in all kinds of weather, thus giving the car a much quicker get-away.

The horn H has one terminal grounded, as indicated in Fig. 7, and is connected through a switch H. S. with the positive terminal of the second battery.

Operation

Assume the parts to be positioned as shown in Fig. 7. To start the engine at normal temperatures, simply close ignition switch I. S. and press on starter button S. S. Current now flows from terminals 12 of both batteries "1st B" and "2nd B" via connectors 23, 25 and magnetic switch to ammeter A, and from thence to coil D via L. S. and C—also to motor M from battery—which starts the motor, whereupon switch S. S. is released and the starter motor's circuit opened.

If sub-zero weather be encountered, then to start the engine one holds the push button of switch P. B. S. in and then presses starter switch S. S. Closing switch P. B. S. causes magnet 53 to become energized which then pulls down core-armature 51 and blades 42 and 35, thereby opening the contacts 38, 43 and 37, 36 and closing contacts 36, 38. Therefore when switch S. S. is closed, current will flow from terminal 12 of the second battery through starting motor M to ground and return via 26 to negative terminal 11 of the first battery, through the first battery to positive terminal 12 thereof and from thence via 23 to terminal 22, across contacts 38, 36 and blade 35 to terminal 20 and from thence via 21 to negative terminal 11 of the second battery, thereby applying double voltage to the starter. With switch P. B. S. closed, the single (6 v.) voltage current also passes from contact 38 via terminal 27, ammeter A, to switch L. S., etc., and spark plugs. With button P. B. S. closed, current from the first battery only will flow, via ammeter A, to the lighting switch L. S. at six volts. With switch P. B. S. closed and switch H. S. closed, the horn will operate on twelve-volt current, but after the switch P. B. S. is opened again the horn will operate only on the six-volt current.

After starting the engine, switch P. B. S. is released and the parts return to the position shown in Fig. 7. With the engine running fast enough for battery charging purposes, current will flow from generator G. via C. U. and A to terminal 27 and from thence via 58 to contacts 38—38 where it divides, one part flowing via blade 42 and connector 25 to the positive terminal 12 of the second battery and the other part via 23 to the positive terminal 12 of the first battery. The two negative terminals 11 of the batteries, being now connected together via 19, 18, 37, 35, 20, 21, are grounded via 26. Thus the normal charging voltages to each battery is maintained and both batteries are charged at the same voltage. The lighting and ignition circuits are now on six volts (batteries in parallel). Batteries charged in parallel will equalize their charge. By having two extra plates in each cell of the first battery it will have an advantage of higher voltage to operate the ignition while the car motor is being started in series, and as the magnet and ignition current is taken from the first battery (while starting in series), causing it to wear out faster, the life of the batteries will be more even.

From the foregoing description, taken in connection with the accompanying drawing, it is thought that the construction, operation and advantages of the invention will be clear to those skilled in the art.

This application is a continuation in part of my application Ser. No. 317,762, filed February 7, 1940.

What I claim is:

1. A battery comprising a plurality of groups of equi-number cells and a series-parallel switching apparatus, said switching apparatus having means connecting said groups normally in parallel and having manually controllable means for connecting the groups in series, said groups comprising two groups of three two volt cells each, the cells of a group being permanently connected in series and said switching device comprising a frame having four main terminals insulated from said frame, the first of said main terminals being connected to the negative terminal of the first cell group, the second of said main terminals being connected to the negative terminal of the second cell group, the third of said main terminals being connected to the positive terminal of the first cell group and the fourth of said main terminals being connected to the positive terminal of the second cell group, a blade pivoted to the second main terminal and having a double contact to cooperate with either the first or the third main terminal at a time, a second blade pivoted to the fourth main terminal and having a contact to cooperate with the third terminal only. means continuously tending to keep said first blade's contact in electrical connection with said first main terminal and said second blade's contact in electrical connection with said third main terminal, and electro-magnetic means to rock said blades to open the said electrical connections and make an electrical connection between said first blade's contact and said third main terminal.

2. In an electrical system for a motor vehicle wherein is provided a generator, a lighting circuit, an ignition circuit, a starting motor circuit containing a starting switch and a starting motor; the combination with the aforesaid structure of a battery composed of two units of like potentials, and a manually controlled electromagnetically actuated switching apparatus which includes three fixed contacts, two of which are electrically connected together and to the ignition and generator circuits and to the positive pole of one battery unit, the third of said fixed contacts being electrically connected to the negative terminal of said one battery unit and to ground, said switch apparatus also including two movable contacts, one of which is constructed to cooperate alternately with said third fixed contact and with one of the two fixed contacts that are connected together, an electrical connection between the first mentioned of said two movable contacts and the negative pole of the second battery unit, the second of the said movable contact members being connected with the positive terminal of the second battery unit, which terminal is also connected in the starting motor circuit, said switching apparatus also including a solenoidal magnet, one terminal of which is connected to the generator circuit and to said connected-together fixed contacts and the other terminal of which is grounded via a manually operated circuit closer.

3. In an electrical system for a motor vehicle wherein is provided a generator, a lighting circuit, an ignition circuit, a signal horn circuit, a starting motor circuit containing a starting switch and a starting motor; the combination with the aforesaid structure of a battery composed of two units of like potentials, and a manually controlled electromagnetically actuated switching apparatus which includes three fixed contacts, two of which are electrically connected together and to the ignition, lighting and generator circuits and to the positive pole of one battery unit, the third of said fixed contacts being electrically connected to the negative terminal of said one battery unit and to ground, said switch apparatus also including two movable contacts, one of which is constructed to cooperate alternately with said third fixed contact and with one of the two fixed contacts that are connected together, an electrical connection between the first mentioned of said two movable contacts and the negative pole of the second battery unit, the second of the said movable contact members being connected with the positive terminal of the second battery unit, which terminal is also connected in the starting motor circuit and to the signal horn circuit, said switching apparatus also including a solenoidal magnet, one terminal of which is connected to the generator circuit and to said connected-together fixed contacts and the other terminal of which is grounded via a manually operated circuit closer.

4. In an electrical system for motor vehicles, a generator, a lighting circuit, an ignition circuit, a starting motor circuit, a signal circuit, a battery composed of two distinct units each having a positive pole and a negative pole, one terminal of said lighting circuit being grounded and the other terminal thereof being electrically connected to the positive terminal of one of said units, one terminal of said signal circuit being electrically connected to the positive terminal of the second of said battery units and the other terminal of said signal circuit being grounded, and a manually controlled electromagnetically actuated switching apparatus which includes three fixed contacts, two of which are electrically connected together and to the ignition, lighting and generator circuits and to the positive pole of one battery unit, the third of said fixed contacts being electrically connected to the negative terminal of said one battery unit and to ground, said switch apparatus also including two movable contacts, one of which is constructed to cooperate alternately with said third fixed contact and with one of the two fixed contacts that are connected together, an electrical connection between the first mentioned of said two movable contacts and the negative pole of the second battery unit, the second of the said movable contact members being connected with the positive terminal of the second battery unit, which terminal is also connected in the starting motor circuit and to the signal circuit, said switching apparatus also including a solenoidal magnet, one terminal of which is connected to the generator circuit and to said connected-together fixed contacts and the other terminal of which is grounded via a manually operated circuit closer, by virtue of all of which the charging of the battery is effected with the units in parallel and the lights receive only the voltage of a single battery unit regardless of the position of the switching apparatus, and the horn circuit receives either the voltage of a single battery unit or the combined voltage of both battery units accordingly as said switching apparatus is in one position or the other.

HARRY F. MITCHELL.